United States Patent
Gerebe et al.

(10) Patent No.: US 10,956,563 B2
(45) Date of Patent: Mar. 23, 2021

(54) SYSTEM FOR SECURING SOFTWARE CONTAINERS WITH EMBEDDED AGENT

(71) Applicants: Amir Gerebe, Givatayim (IL); Rani Osnat, Tel Aviv (IL)

(72) Inventors: Amir Gerebe, Givatayim (IL); Rani Osnat, Tel Aviv (IL)

(73) Assignee: AQUA SECURITY SOFTWARE, LTD.

(*) Notice: Subject to any disclaimer, the term of this patent is extended or adjusted under 35 U.S.C. 154(b) by 508 days.

(21) Appl. No.: 15/821,255

(22) Filed: Nov. 22, 2017

(65) Prior Publication Data
US 2019/0156023 A1    May 23, 2019

(51) Int. Cl.
| | | |
|---|---|---|
| G06F 21/54 | (2013.01) | |
| H04L 9/32 | (2006.01) | |
| G06F 21/44 | (2013.01) | |
| G06F 21/51 | (2013.01) | |

(52) U.S. Cl.
CPC .............. *G06F 21/54* (2013.01); *G06F 21/44* (2013.01); *G06F 21/51* (2013.01); *H04L 9/3226* (2013.01); *G06F 2221/033* (2013.01)

(58) Field of Classification Search
CPC .......... G06F 21/44; G06F 21/54; G06F 21/51; G06F 21/565; G06F 2221/033; G06F 9/45558; G06F 21/577; G06F 21/53; H04L 9/3226; H04L 63/08; H04L 63/20
USPC ............................................... 713/189; 726/1
See application file for complete search history.

(56) References Cited

U.S. PATENT DOCUMENTS

| | | | | |
|---|---|---|---|---|
| 5,881,287 | A * | 3/1999 | Mast ...................... | G06F 21/10 705/57 |
| 6,745,385 | B1 * | 6/2004 | Lupu .................. | G06F 9/44521 717/148 |
| 9,183,378 | B2 * | 11/2015 | Banerjee .................. | G06F 9/00 |
| 9,246,686 | B1 * | 1/2016 | Holland ................ | H04L 9/3236 |
| 9,503,482 | B1 * | 11/2016 | Hugenbruch ........... | H04L 63/20 |
| 10,154,065 | B1 * | 12/2018 | Buchler ................. | H04L 63/20 |
| 10,719,369 | B1 * | 7/2020 | Aithal .................... | H04L 63/00 |
| 2001/0013064 | A1 * | 8/2001 | Cox ......................... | G06F 8/61 709/220 |
| 2003/0061487 | A1 * | 3/2003 | Angelo ................ | G06F 21/565 713/176 |
| 2006/0273151 | A1 * | 12/2006 | Block .................... | G07F 19/20 235/379 |
| 2008/0072066 | A1 * | 3/2008 | Vogler ................... | G06F 21/31 713/187 |

(Continued)

*Primary Examiner* — Shahriar Zarrineh
(74) *Attorney, Agent, or Firm* — Carlson, Gaskey & Olds, P.C.

(57) ABSTRACT

A computer-implemented method of providing security for a software container, according to an example of the present disclosure includes, receiving a software container image with a software application and security agent that is separate from the software application. An execution entry point of the software container image that was previously configured to launch the software application has been modified to instead launch the security agent. The method includes receiving a request to instantiate the software container image as a software container, launching the security agent based on the request, authenticating the contents of the software container image, and controlling operation of the software application based on the authenticating.

13 Claims, 4 Drawing Sheets

(56) References Cited

U.S. PATENT DOCUMENTS

| | | | |
|---|---|---|---|
| 2008/0148402 A1* | 6/2008 | Bogineni | H04L 63/0428 726/22 |
| 2009/0287831 A1* | 11/2009 | Nakagawa | H04L 63/08 709/228 |
| 2010/0132016 A1* | 5/2010 | Ferris | G06F 21/6218 726/4 |
| 2011/0009107 A1* | 1/2011 | Guba | H04W 4/027 455/418 |
| 2013/0081104 A1* | 3/2013 | Jung | G06F 21/629 726/1 |
| 2014/0013428 A1* | 1/2014 | Brett | G06F 21/50 726/22 |
| 2014/0137184 A1* | 5/2014 | Russello | G06F 21/60 726/1 |
| 2014/0245446 A1* | 8/2014 | Shanmugavelayutham | G06F 21/54 726/24 |
| 2015/0169852 A1* | 6/2015 | Lange | H04L 63/0876 726/1 |
| 2015/0309849 A1* | 10/2015 | Lau | G06F 9/468 715/835 |
| 2016/0171250 A1* | 6/2016 | Boivie | G06F 21/6209 713/189 |
| 2017/0052807 A1* | 2/2017 | Kristiansson | G06F 9/54 |
| 2017/0109536 A1* | 4/2017 | Stopel | G06F 21/577 |
| 2017/0116415 A1* | 4/2017 | Stopel | G06F 21/53 |
| 2017/0118249 A1* | 4/2017 | Motukuru | H04L 63/102 |
| 2017/0147813 A1* | 5/2017 | McPherson | G06F 21/50 |
| 2017/0171157 A1* | 6/2017 | Hristov | H04L 63/10 |
| 2017/0177860 A1* | 6/2017 | Suarez | G06F 21/31 |
| 2017/0180346 A1* | 6/2017 | Suarez | G06F 9/45558 |
| 2017/0187540 A1* | 6/2017 | Stopel | H04L 9/3268 |
| 2017/0264342 A1* | 9/2017 | Yang | H04W 4/80 |
| 2017/0300697 A1* | 10/2017 | Iyer | G06F 21/44 |
| 2017/0318048 A1* | 11/2017 | Htay | H04L 63/1433 |
| 2017/0353433 A1* | 12/2017 | Antony | H04L 63/0263 |
| 2017/0372045 A1* | 12/2017 | Dondl | G06F 21/121 |
| 2018/0027022 A1* | 1/2018 | Nagaratnam | H04L 63/20 726/1 |
| 2018/0032720 A1* | 2/2018 | Milner | G06F 21/564 |
| 2018/0052867 A1* | 2/2018 | Seiden | G06F 16/188 |
| 2018/0062908 A1* | 3/2018 | Rachamadugu | G06F 9/4856 |
| 2018/0069834 A1* | 3/2018 | Angelsmark | H04L 63/02 |
| 2018/0103064 A1* | 4/2018 | Ahuja | H04L 63/20 |
| 2018/0115514 A1* | 4/2018 | Chou | G06F 21/53 |
| 2018/0115585 A1* | 4/2018 | Rubakha | H04L 63/105 |
| 2018/0152417 A1* | 5/2018 | Jain | H04L 63/0263 |
| 2018/0157516 A1* | 6/2018 | Kristiansson | G06F 9/5055 |
| 2018/0234450 A1* | 8/2018 | Li | H04L 63/1433 |
| 2018/0260566 A1* | 9/2018 | Chaganti | G06F 21/577 |
| 2018/0285165 A1* | 10/2018 | Helsley | G06F 9/5077 |
| 2018/0293394 A1* | 10/2018 | Gunda | G06F 9/45558 |
| 2019/0005246 A1* | 1/2019 | Cherny | G06F 21/57 |
| 2019/0036678 A1* | 1/2019 | Ahmed | H04L 9/083 |

* cited by examiner

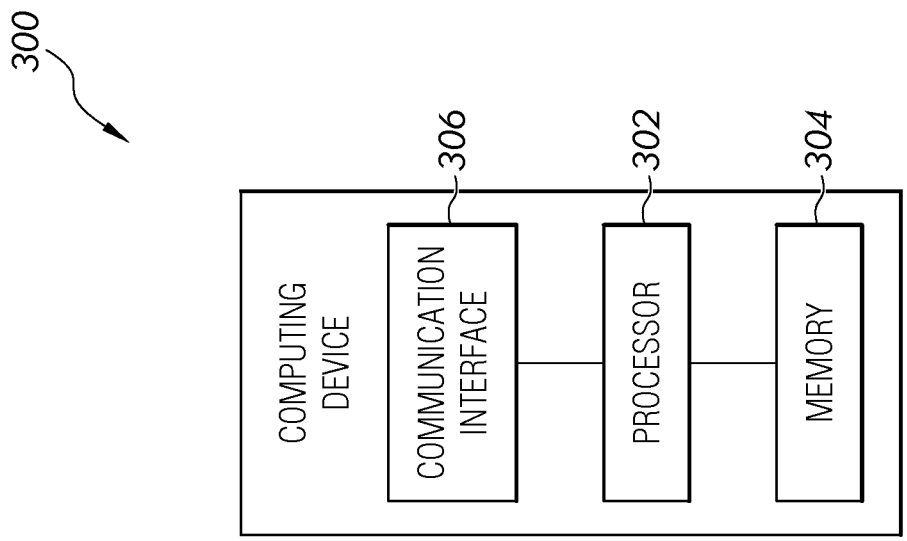

SYSTEM FOR SECURING SOFTWARE CONTAINERS WITH EMBEDDED AGENT

BACKGROUND

This application relates to software containers, and more particularly to security features for software containers.

Virtual machines have gained popularity for a variety of computing tasks. A virtual machine is a software implementation of a physical machine that executes programs like a physical machine. A typical virtual machine includes an entire additional operating system that runs on top of a host operating system, and one or more applications that run within that additional operating system. Virtual machines enable administrators to run several operating system instances at the same time on a single server. A specialized application called a hypervisor manages the virtual machines that run on a given server. Running multiple operating system instances on a single physical machine, however, is resource-intensive.

More recently, software containers are being used as an alternative to running multiple virtual machines. Software containers allow administrators to virtualize a single application, or group of applications, rather than an entire operating system. A software container includes a software application plus dependencies required to run the application bundled into one package. The dependencies may include libraries, binaries, and/or configuration files, for example. By containerizing the application and its dependencies, differences in operating system distributions and underlying infrastructure are abstracted away, making it easy to migrate an application between various environments (e.g., development, testing, and production).

Multiple software containers can be run in isolation from each other on a single host operating system, which provides an alternative to running multiple virtual machines and their accompanying operating systems on a single server. Because software containers allow an administrator to virtualize a single application rather than an entire operating system, running a given quantity of software containers is less resource intensive than running the same quantity of virtual machines. One platform for building and running software containers is DOCKER.

Software containers are instantiated from software container images which include a collection of files that are grouped into one or more layers, and also include a manifest that identifies the one or more layers. In some container environments, a given layer can be linked to many software container images while only being stored once in memory. If a user modifies a layer of a software container image without authorization, a software container instantiated from the software container image may not function properly, and may even become infected with malware.

SUMMARY

A computer-implemented method of providing security for a software container according to an example of the present disclosure includes receiving a software container image with a software application and a security agent that is separate from the software application. An execution entry point of the software container image that was previously configured to launch the software application has been modified to instead launch the security agent. The method includes receiving a request to instantiate the software container image as a software container, launching the security agent based on the request, authenticating the contents of the software container image, and controlling operation of the software application based on the authenticating.

In a further embodiment of any of the foregoing embodiments, controlling operation of the software application based on the authenticating includes the security agent preventing launch of the software application based on the authentication failing. Based on the authentication succeeding, the security agent launches the software application, and controls runtime operation of the software application from within the software container based on a security policy of the software application.

In a further embodiment of any of the foregoing embodiments, controlling runtime operation of the software application from within the container based on the security policy includes the security agent: implementing operating system hooks that are configured to intercept requests from the software application, wherein the operating system hooks are implemented prior to launching the software application, and controlling from within the software container whether intercepted requests of the software application are granted based on the security policy.

In a further embodiment of any of the foregoing embodiments, the operating system hooks are configured to detect one or more of the following: a file system access requested by the software application, processes requested by the software application, and network access requested by the software application.

In a further embodiment of any of the foregoing embodiments, the method includes receiving the security policy from a security server based on the authenticating, transmitting a security notification from the security agent to the security server if the software application attempts an action that violates the security policy, and maintaining by the security server a log of security notifications received for the software application.

In a further embodiment of any of the foregoing embodiments, the authenticating the contents of the software container image includes creating, by the security agent, a second cryptographic fingerprint based on the contents of the software container image and based on the request, wherein the authenticating is based on a comparison of the second cryptographic fingerprint to a preexisting first cryptographic fingerprint that was previously created by the security agent based on the contents of the software container image.

In a further embodiment of any of the foregoing embodiments, the method includes transmitting the second cryptographic fingerprint to a security server for comparison against the preexisting first cryptographic fingerprint, and determining whether the contents of the container image are authenticated based on a response received from the security server.

In a further embodiment of any of the foregoing embodiments, the method includes the security server: receiving the first cryptographic fingerprint during a first time period, receiving the second cryptographic fingerprint during a subsequent second time period, comparing the first and second cryptographic fingerprints, transmitting a notification to the security agent indicating that the software container image is authenticated based on the first and second cryptographic signatures matching, and transmitting a notification to the security agent that the software container image is not authenticated based on the first and second cryptographic signatures not matching.

In a further embodiment of any of the foregoing embodiments, the method includes the security server transmitting a security policy for the software application to the security agent if the first and second cryptographic signatures match.

In a further embodiment of any of the foregoing embodiments, the method includes the security server determining an application type of the software application, and selecting the security policy based on the application type.

In a further embodiment of any of the foregoing embodiments, selecting the security policy based on the application type includes selecting a default security policy of the application type for the software application if a specific security policy for the software application has not been received at the security server.

A computer-implemented method of providing security for a software container image according to an example of the present disclosure includes embedding a security agent within a software container image that also includes a software application, wherein the security agent is configured to control operation of the software application when the software container image is instantiated as a software container based on a security policy and a cryptographic fingerprint of the software container image. The method also includes replacing an initial execution entry point of the software container image that would have launched the software application upon software container image instantiation with a modified execution entry point that instead launches the security agent upon software container image instantiation.

In a further embodiment of any of the foregoing embodiments, the method includes transmitting a security policy for the software application to a security server for storage, wherein the security server is different from a computing device that performs the embedding, and the security agent is configured to download the security polity from the security server at runtime when the software container image is instantiated as a container.

In a further embodiment of any of the foregoing embodiments, the embedding includes adding a layer that includes the security agent to the software container image without modifying preexisting layers in the software container image.

A computing device according to an example of the present disclosure includes memory configured to store a software container image that includes a software application and a security agent that is separate from the software application. An execution entry point of the software container image that was previously configured to launch the software application has been modified to instead launch the security agent. A processor is operatively connected to the memory and is configured to: receive a request to instantiate the software container image as a software container, launch the security agent based on the request, authenticate the contents of the software container image, and control operation of the software application based on the authentication.

In a further embodiment of any of the foregoing embodiments, to control operation of the software application based on the authentication, the processor is configured to operate the security agent to prevent launch of the software application based on the authentication failing; and based on the authentication succeeding: launch the software application, and control runtime operation of the software application from within the software container based on a security policy of the software application.

In a further embodiment of any of the foregoing embodiments, to control runtime operation of the software application from within the container based on the security policy, the processor is configured to operate the security agent to: implement operating system hooks that intercept requests from the software application, wherein the operating system hooks are implemented prior to launch of the software application; and control, from within the software container, whether intercepted requests of the software application are granted based on the security policy.

In a further embodiment of any of the foregoing embodiments, the operating system hooks are configured to detect one or more of the following: file system access requested by the software application, processes requested by the software application, and network access requested by the software application.

In a further embodiment of any of the foregoing embodiments, the processor is configured to operate the security agent to create a second cryptographic fingerprint based on the contents of the software container image and based on the request. The authentication is based on a comparison of the second cryptographic fingerprint to a preexisting first cryptographic fingerprint that was previously created by the security agent based on the contents of the software container image.

In a further embodiment of any of the foregoing embodiments, the processor is configured to transmit the second cryptographic fingerprint to a security server for comparison against the preexisting first cryptographic fingerprint, and determine whether the contents of the container image are authenticated based on a response received from the security server.

A computing device according to an example of the present disclosure includes memory configured to store a software container image that includes a software application, and a processor that is operatively connected to the memory. The processor is configured to embed a security agent within the software container image, wherein the security agent is configured to control operation of the software application when the software container image is instantiated as a software container based on a security policy and a cryptographic fingerprint of the software container image. The processor is also configured to replace an initial execution entry point of the software container image that would have launched the software application upon software container image instantiation with a modified execution entry point that instead launches the security agent upon software container image instantiation.

In a further embodiment of any of the foregoing embodiments, the processor is configured to: transmit a security policy for the software application to a security server for storage. The security server is different from a computing device that performs the embedding, and the security agent is configured to download the security polity from the security server at runtime when the software container image is instantiated as a container.

In a further embodiment of any of the foregoing embodiments, to embed the security agent, the processor is configured to add a layer that includes the security agent to the software container image without modifying preexisting layers in the software container image.

These and other features may be best understood from the following drawings and specification.

BRIEF DESCRIPTION OF THE DRAWINGS

FIG. 3 schematically illustrates an example computing device.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
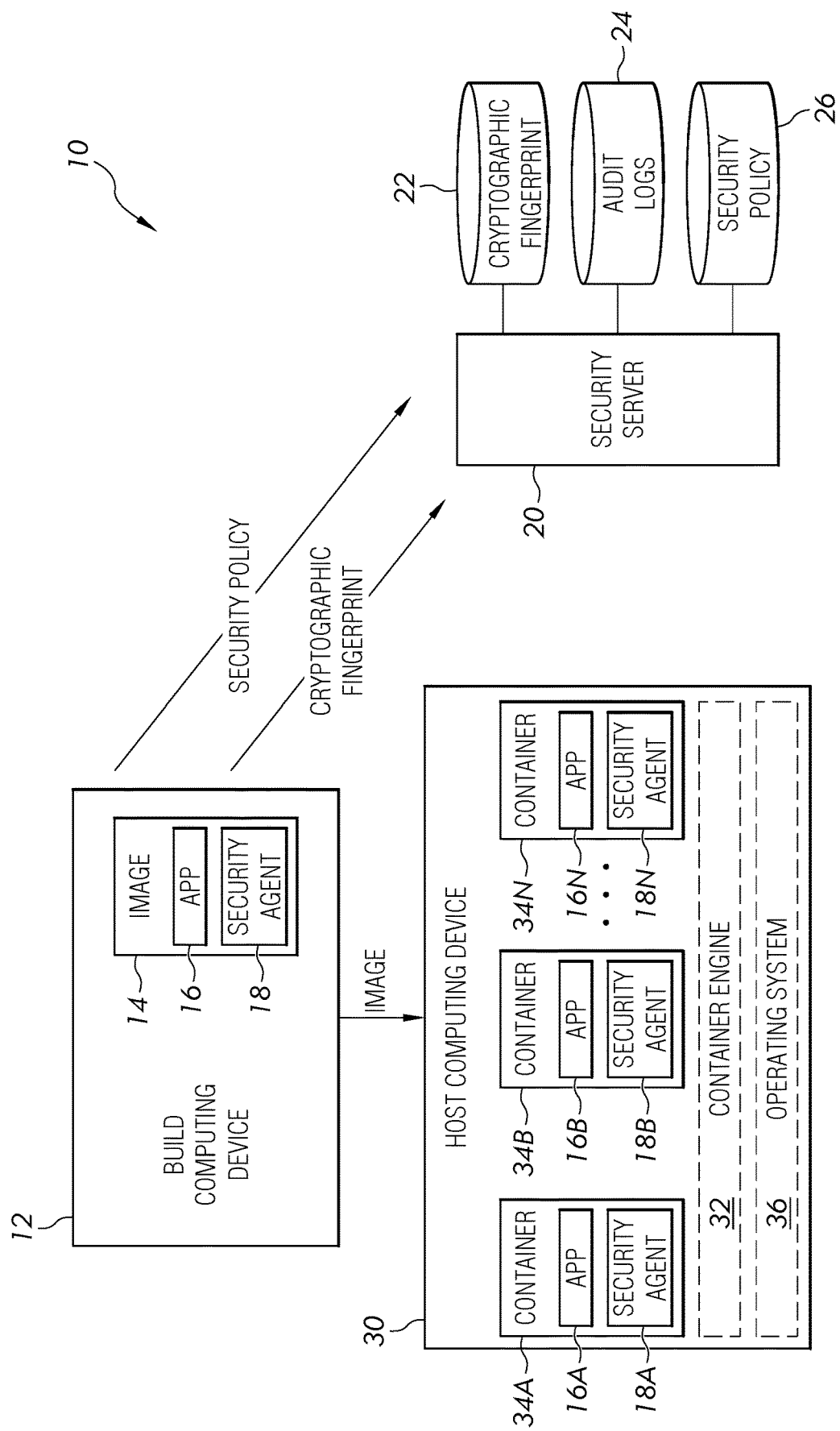
FIG. 1 schematically illustrates a system that provides security for software containers.

FIG. 1 schematically illustrates a system 10 for providing security for software containers. The system 10 includes a build computing device 12, a security server 20, and a host computing device 30. The build computing device 12 embeds a security agent 18 into a software container image 14 and provides a security policy for the software container image 14 to the security server. The software container image 14 is deployed to the host computing device 30.

The host computing device 30 uses a container engine 32 to instantiate the software container image 14 as a container 34. When this instantiation happens, the embedded security agent 18 is launched, which provides for an authentication of the software container image 14, and for control of runtime operation of a software application 16 within the software container image 14 based on the security policy.

The embedded security agent 18 provides visibility into software container 34 activity, and provides for enforcement of the security policy, which can include the ability to stop, from within the instantiated software container 34, unauthorized network connections, file access, or user access. When it is launched, the security agent 18 is aware that it is deployed inside of an instantiated software container 34, is aware of the identity of the instantiated software container 34, and can therefore apply appropriate controls based on that identity.

Figure 2A:
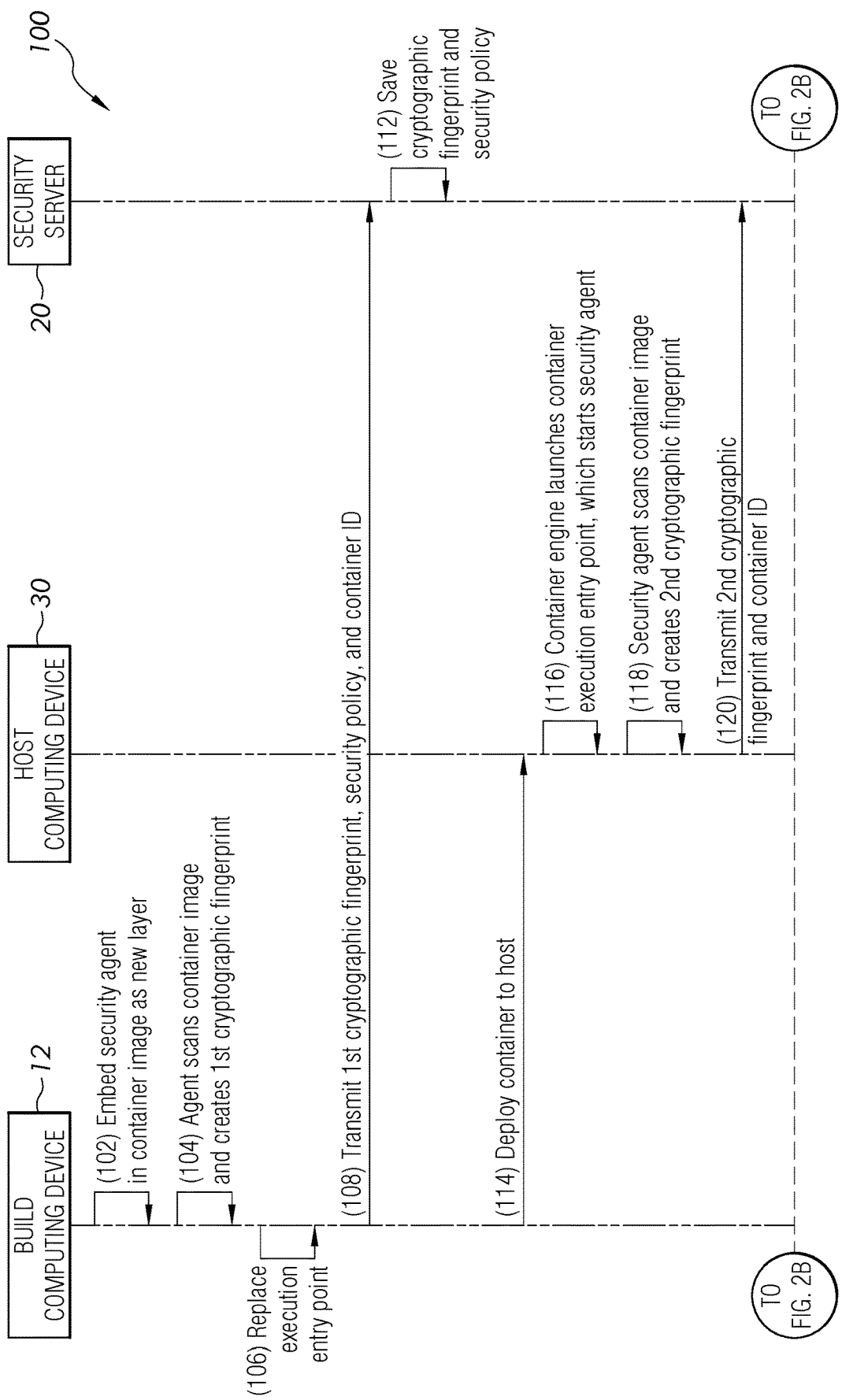
FIGS. 2A-B are representative of an example method of operating the system of FIG. 1.
Figure 2B:
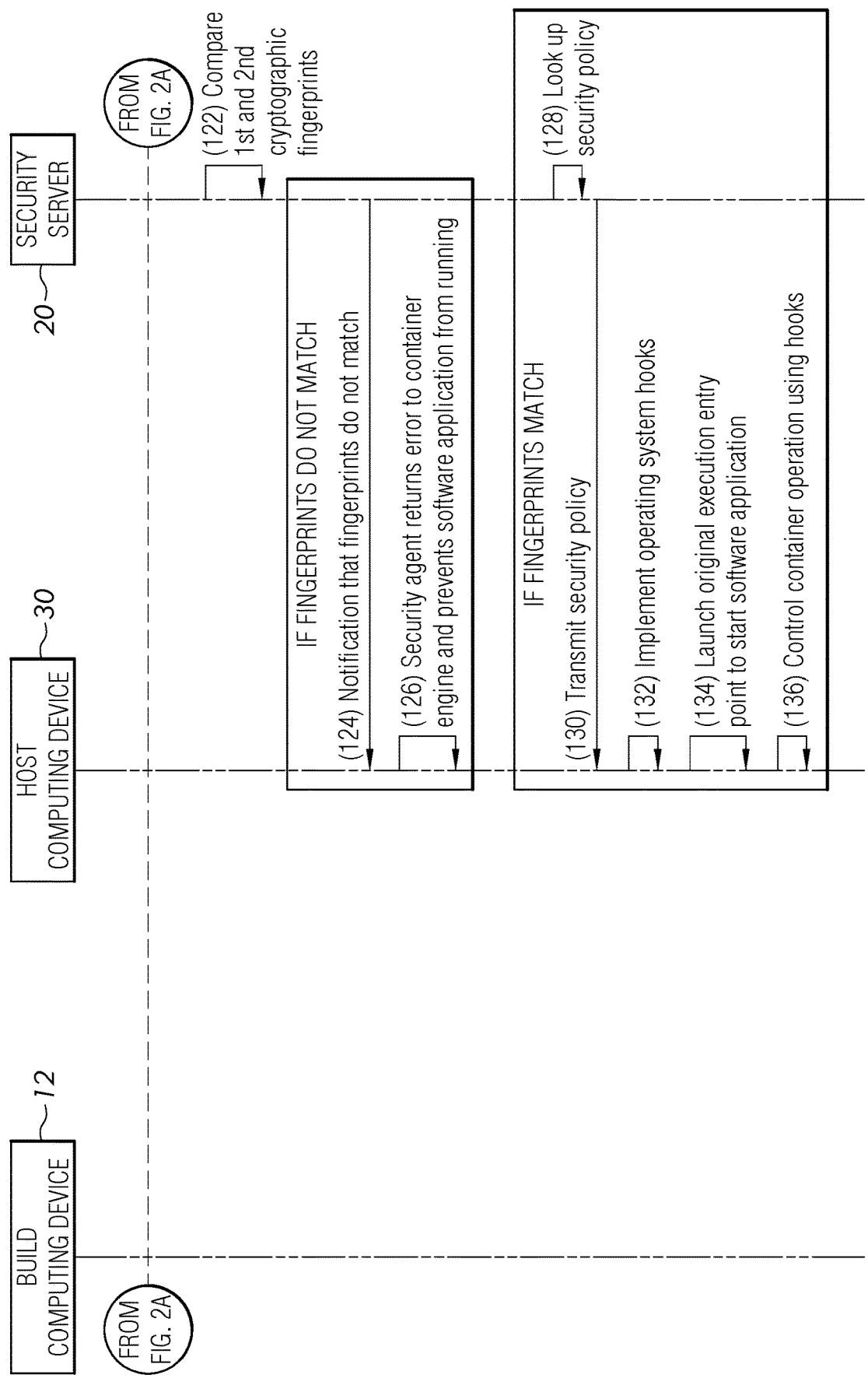

These operations are discussed in greater detail in FIGS. 2A-B, which are representative of an example method 100 of operating the system 10. FIGS. 2A-B will be discussed below with reference to items in FIG. 1.

The build computing device 12 creates or obtains a software container image 14 that includes the software application 16, and embeds the security agent 18 within the software container image 14 (step 102). The software container image 14 also includes a manifest (not shown) that describes the contents of the software container image 14. In particular, the manifest describes one or more layers that are present in the software container image 14, and the file contents of those layers. In one example, the embedding of the security agent 18 corresponds to adding a layer that includes the security agent to the software container image 14 as an additional entry in its manifest.

As part of the embedding of step 102, the security agent 18 is configured with an identifier (ID) of the software container image 14. The ID could be mapped to one or any combination of the following, for example: an owner of the software container image 14, a user name, a timestamp (e.g., of the embedding), a creator of the software container image 14, etc.

Although only one application is shown in the build computing device's example software container image 14 in FIG. 1, the software container image 14 may include a plurality of software applications 16, each present in separate layers. The software container image 14 may also include one or more non-application layers that store file libraries (e.g., for supporting runtime operation of the software application 16).

The build computing device 12 scans the content of the software container image 14 based on the manifest, and creates a unique first cryptographic fingerprint for the software container image based on the content (step 104). The cryptographic fingerprint tracks and ensures the integrity and identify of the software container image 14 throughout its lifecycle. The cryptographic finger print is a digital fingerprint, and in some examples is based on a hash function. In some examples, the security agent 18 excludes its own layer from the scanning of the fingerprint creation.

Each software container image 14 has an execution entry point that tells the container engine 32 what application to launch when the software container image 14 is instantiated. The build computing device 12 replaces an initial execution entry point of the software container image 14 that would have launched the software application 16 upon instantiation of the software container image 14 with a modified execution entry point that instead launches the security agent 18 upon instantiation of the software container image 14 (step 106). Steps 102-106 correspond to a "build phase." The analysis of the software container image's software package inventory during the build phase serves as a baseline for a subsequent vulnerability assessment.

The build computing device 12 transmits the first cryptographic fingerprint, the container ID of the software container image 14, and a security policy for the software container image 14 to the security server 20 in one or more transmissions (step 108). The security server 20 receives the cryptographic fingerprint, and stores it in a cryptographic fingerprint repository 22, and stores the security policy in a security policy repository 26 (step 112). Thus, the first cryptographic fingerprint is received at during a first time period, and the second cryptographic fingerprint is received during a subsequent second time period, which may be days, weeks, or months later than the first time period in some examples.

The build computing device 12 deploys the software container image 14 to the host computing device 30 (step 114). The container engine 32 of the host computing device 30 instantiates the software container image 14 as one of its instantiated software containers 34A-N. The container engine 32 runs on top of an operating system 36 of the host computing device 30.

The container engine 32 creates environments for the software applications 16A-N within their respective containers 34, and also controls an operational state of the containers 34 (e.g., whether they are running or stopped, or being imported) and also controls preserving a state of the containers (e.g., container saving and exporting). One example container engine 32 is part of the DOCKER platform, for example.

Upon receiving a request to instantiate the software container image 14 as a container 34, the container engine 32 launches the execution entry point of the software container image 14, which has been modified in step 106 to launch the security agent 18 (step 116).

The security agent 18 authenticates the contents of the software container image 14 by scanning the content of the software container image 14 based on its manifest, and creating a second cryptographic fingerprint for the software container image based on the content (step 118). In some examples, the security agent 18 excludes its own layer from the scanning of the second fingerprint creation. The host computing device 30 transmits the second cryptographic fingerprint to the security server 20 for comparison against the preexisting first cryptographic fingerprint stored in the cryptographic fingerprint repository 22, along with the container ID of the software container image 14 (step 120). In the example of FIGS. 2A-B, the security server 20 performs an authentication by comparing the two cryptographic fingerprints, and the security agent 18 on the host computing device 30 performs an authentication through its transmittal of the second cryptographic fingerprint, and its receipt of a response from the security server 20 indicating the results of the comparison.

The security server 20 compares the second cryptographic fingerprint to the first cryptographic fingerprint to determine if they match (step 122). To "match," the cryptographic fingerprints indicate that the contents of the software container image 14 have not been modified since the first cryptographic signature was created. If the fingerprints do not match, the security server 20 determines that the software container image 14 has been modified, and provides a notification to the security agent 18 running on the host computing device 30 that the contents of the software container image 14 have not been authenticated (step 124). Based on this notification, the security agent 18 returns an error to the container engine 32 and prevents the software application 16 from running (step 126). In one example, the security agent 18 instructs the container engine 32 to shut down the instantiated container 34 based on the failed authentication. Thus, the security agent 18 controls whether the software application 16 is launched based on the authentication Conversely, if the cryptographic fingerprints do match, the security server 20 looks up the security policy for the software container image 14 from the security policy repository 26 (step 128), and transmits the security policy to the security agent 18 (step 130). This message, or a separate message, serves as a notification that the contents of the software container image are authenticated.

The lookup of the security policy is based on the container ID of the software container image 14, and in some examples is further based on an application type of the application 16 within the software container image 14. In one example, if a specific security policy has not been provided for the software container image 14, the security server 20 determines an application type of the software application 16 and selects a default security policy for the application type. In such examples, the container ID of the software container image 14 is mapped to an application type at the security server 20 (e.g., web server application type, database application type, etc.). In one example, the security server 20 further bases its identification of a default security polity based on a version of the software application 16 in the software container image 14.

As an example of how application type affects security policy, consider that a default profile for a database application container may differ from a logging application container. In one example, a database container would only need inbound network connections, and may have multiple inbound connections querying it, but no outbound connections. A logging container on the other hand may, in one example, require an outbound network connection to send logs to external security event management or analytics solution The security agent 18 controls operation of the software application 16 from within the instantiated software container 34. The security agent 18 implements operating system hooks into the operating system 36 that intercept requests from the software application 16 (step 132). Once the operating system hooks are implemented, the security agent 18 launches the original execution entry point of the software container image 14, which launches the software application 16 (step 134). The security agent 18 controls container operations using the hooks, by intercepting requests of the software application, and controlling whether those requests are granted based on the security policy for the container 34 (step 136).

In one example, the operating system hooks are configured to detect one or more of: file system access requested by the software application, processes requested by the software application, and network access requested by the software application.

In one example, the operating system hooks include low-level hooks that are implemented into the operating system 36 at the kernel level, which allows the security agent 18 to catch low-level system calls before they are executed by the kernel. Such hooks may be implemented through techniques such as kernel module proxying, system call replacement, process instrumentation, and the like. An example file system hook in the WINDOWS operating system is "minifilter," and an example networking hook in the LINUX operating system is "netfilter," for example.

If the software application 16 requests an access that violates the security policy, the security agent 18 blocks the requested access and transmits a security notification to the security server 20, which maintains a log of security notifications for the software application 16 in the audit log repository 24.

FIG. 3 schematically illustrates a computing device 300 that may be utilized as any of the build computing device 12, security server 20, and host computing device 30. The computing device 300 includes a processor 302 that is operatively connected to memory 304 and a communication interface 306.

The processor 302 includes processing circuitry to carry out steps of method 100 (e.g., all steps of the build computing device 12, all steps of the security server 20, or all steps of the host computing device 30). The processor 302 may include one or more microprocessors, microcontrollers, application specific integrated circuits (ASICs), or the like, for example.

The memory 304 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 304 may incorporate electronic, magnetic, optical, and/or other types of storage media. The memory 304 can also have a distributed architecture, where various components are situated remotely from one another, but can be accessed by the processor 302.

In the case of build computing device 12, the memory 304 stores program instructions that facilitate the embedding of the security agent 18 within the software container image 14.

In the case of security server 20, the memory 304 stores program instructions for comparing and storing cryptographic fingerprints, looking up security policies, and accessing each of the cryptographic fingerprint repository 22, audit log repository 24, and security policy repository 26. The memory 304 may also store the cryptographic fingerprint repository 22, audit log repository 24, and security policy repository 26.

In the case of the host computing device 30, the memory 304 stores program instructions for operating the container engine 32 and security agent 18.

The communication interface 306 is configured to facilitate communication with other computing devices (e.g., if the communication interface 306 includes a networking interface) and/or with user input devices (e.g., if the communication interface 306 includes a wired or wireless interface for receiving and/or providing user input).

In one example, the build computing device 12 and the host computing device 30 are the same device. In other examples, they are separate devices. Also, in one example the security policy is provided to the security server 20 by a device other than the build computing device 12.

Although different examples have specific components shown in the illustrations, embodiments of the present disclosure are not limited to those particular combinations. It is possible to use some of the components or features from one of the examples in combination with features or components from another one of the examples.

Also, although a number of example embodiments have been disclosed, a worker of ordinary skill in this art would recognize that certain modifications would come within the scope of this disclosure. For that reason, the following claims should be studied to determine the true scope and content of this disclosure.

What is claimed is:

1. A computer-implemented method of providing security for a software container, comprising:
   receiving a software container image comprising a software application and security agent that is separate from the software application, wherein an execution entry point of the software container image that was previously configured to launch the software application has been modified to instead launch the security agent;
   receiving a request to instantiate the software container image as a software container;
   launching the security agent based on the request;
   authenticating the contents of the software container image;
   preventing launch of the software application based on the authentication failing; and
   based on the authentication succeeding:
      launching the software application; and
      controlling runtime operation of the software application from within the software container based on a security policy of the software application, wherein the controlling comprises:
         implementing operating system hooks that are configured to intercept requests from the software application, wherein the operating system hooks are implemented prior to said launching the software application; and
         controlling, from within the software container, whether intercepted requests of the software application are granted based on the security policy.

2. The computer-implemented method of claim 1, wherein the operating system hooks are configured to detect one or more of:
   file system access requested by the software application;
   processes requested by the software application; and
   network access requested by the software application.

3. The computer-implemented method of claim 1, comprising:
   receiving the security policy from a security server based on the authenticating;
   transmitting a security notification from the security agent to the security server based on the software application attempting an action that violates the security policy; and
   maintaining, by the security server, a log of security notifications received for the software application.

4. The computer-implemented method of claim 1, wherein said authenticating the contents of the software container image comprises:
   creating, by the security agent, a second cryptographic fingerprint based on the contents of the software container image and based on the request;
   wherein said authenticating is based on a comparison of the second cryptographic fingerprint to a preexisting first cryptographic fingerprint that was previously created by the security agent based on the contents of the software container image.

5. The computer-implemented method of claim 4, comprising:
   transmitting the second cryptographic fingerprint to a security server for comparison against the preexisting first cryptographic fingerprint; and
   determining whether the contents of the container image are authenticated based on a response received from the security server.

6. The computer-implemented method of claim 5, comprising the security server:
   receiving the first cryptographic fingerprint during a first time period;
   receiving the second cryptographic fingerprint during a subsequent second time period;
   comparing the first and second cryptographic fingerprints;
   transmitting a notification to the security agent indicating that the software container image is authenticated based on the first and second cryptographic signatures matching; and
   transmitting a notification to the security agent that the software container image is not authenticated based on the first and second cryptographic signatures not matching.

7. The computer-implemented method of claim 6, comprising the security server:
   transmitting a security policy for the software application to the security agent based on the first and second cryptographic signatures matching.

8. The computer-implemented method of claim 7, comprising the security server:
   determining an application type of the software application; and
   selecting the security policy based on the application type.

9. The computer-implemented method of claim 8, wherein said selecting the security policy based on the application type comprises:
   selecting a default security policy of the application type for the software application based on a specific security policy for the software application not being received at the security server.

10. A computing device comprising:
    memory configured to store a software container image that includes a software application and a security agent that is separate from the software application, wherein an execution entry point of the software container image that was previously configured to launch the software application has been modified to instead launch the security agent; and
    a processor operatively connected to the memory and configured to:
       receive a request to instantiate the software container image as a software container;
       launch the security agent based on the request;
       authenticate the contents of the software container image;

prevent launch of the software application based on the authentication failing; and based on the authentication succeeding:
launch the software application; and
control runtime operation of the software application from within the software container based on a security policy of the software application, wherein to control runtime operation of the software application, the processor is configured to operate the security agent to:
implement operating system hooks that intercept requests from the software application, wherein the operating system hooks are implemented prior to launch of the software application; and
control, from within the software container, whether intercepted requests of the software application are granted based on the security policy.

11. The computing device of claim 10, wherein the operating system hooks are configured to detect one or more of:
file system access requested by the software application; processes requested by the software application; and
network access requested by the software application.

12. The computing device of claim 10, wherein the processor is configured to:
operate the security agent to create a second cryptographic fingerprint based on the contents of the software container image and based on the request;
wherein the authentication is based on a comparison of the second cryptographic fingerprint to a preexisting first cryptographic fingerprint that was previously created by the security agent based on the contents of the software container image.

13. The computing device of claim 12, wherein the processor is configured to:
transmit the second cryptographic fingerprint to a security server for comparison against the preexisting first cryptographic fingerprint; and
determine whether the contents of the container image are authenticated based on a response received from the security server.

* * * * *